Figure 1:
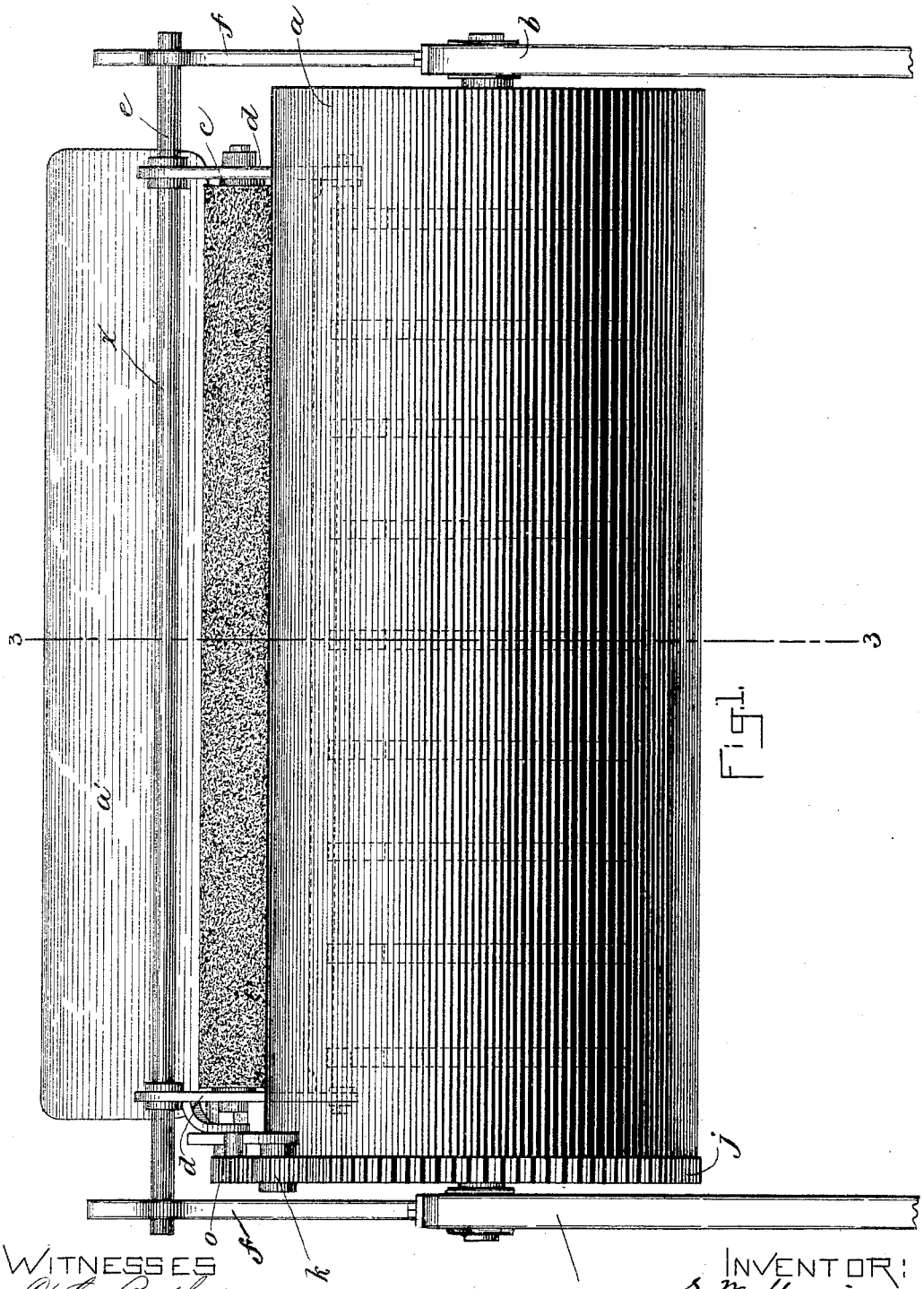

(No Model.) 4 Sheets—Sheet 1.

S. W. MARVIN, W. BURNETT & C. S. MARVIN.
PAPER DUST COLLECTOR FOR PRINTING PRESSES.

No. 437,863. Patented Oct. 7, 1890.

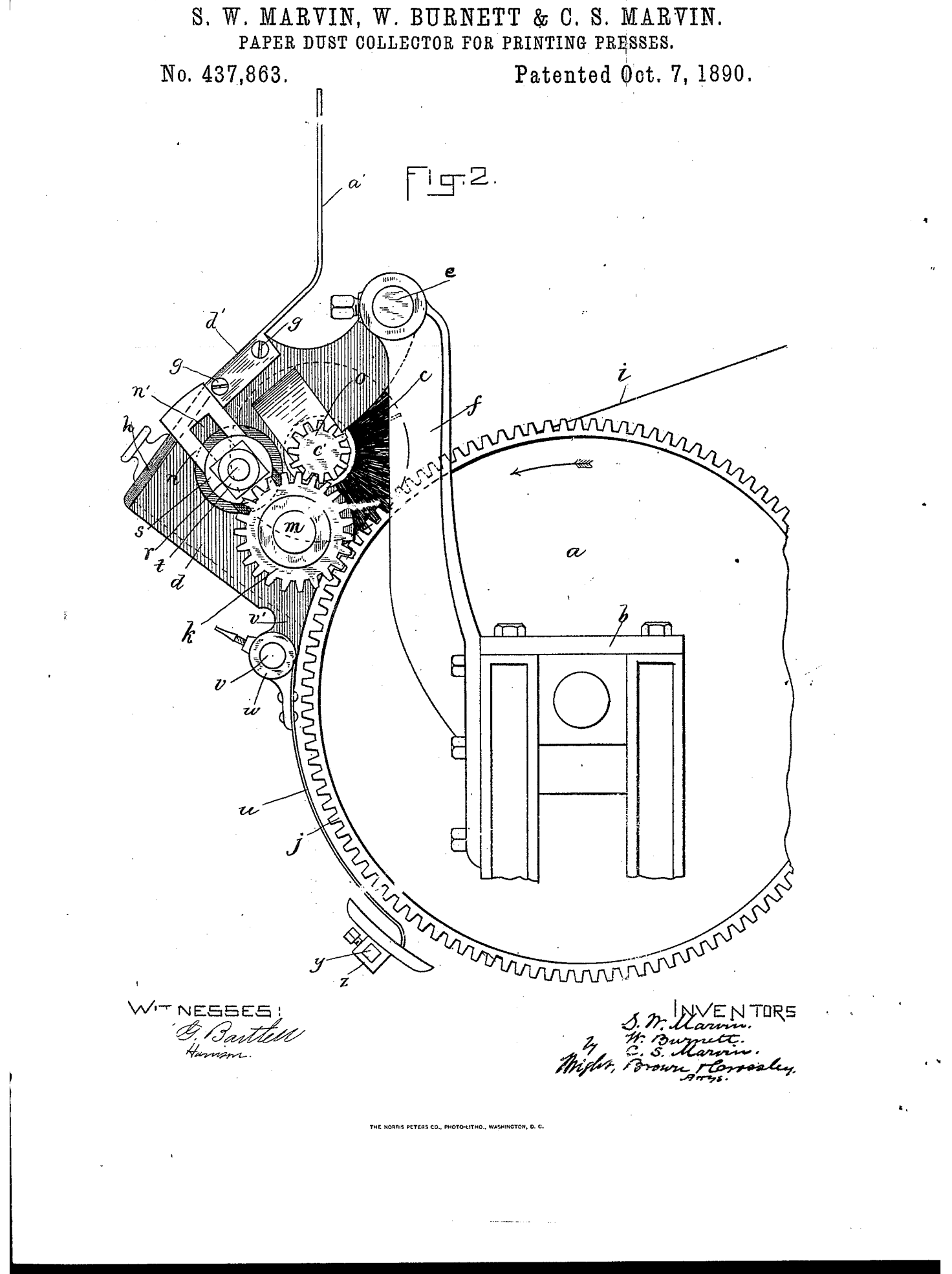

(No Model.) 4 Sheets—Sheet 2.

S. W. MARVIN, W. BURNETT & C. S. MARVIN.
PAPER DUST COLLECTOR FOR PRINTING PRESSES.

No. 437,863. Patented Oct. 7, 1890.

Fig. 2.

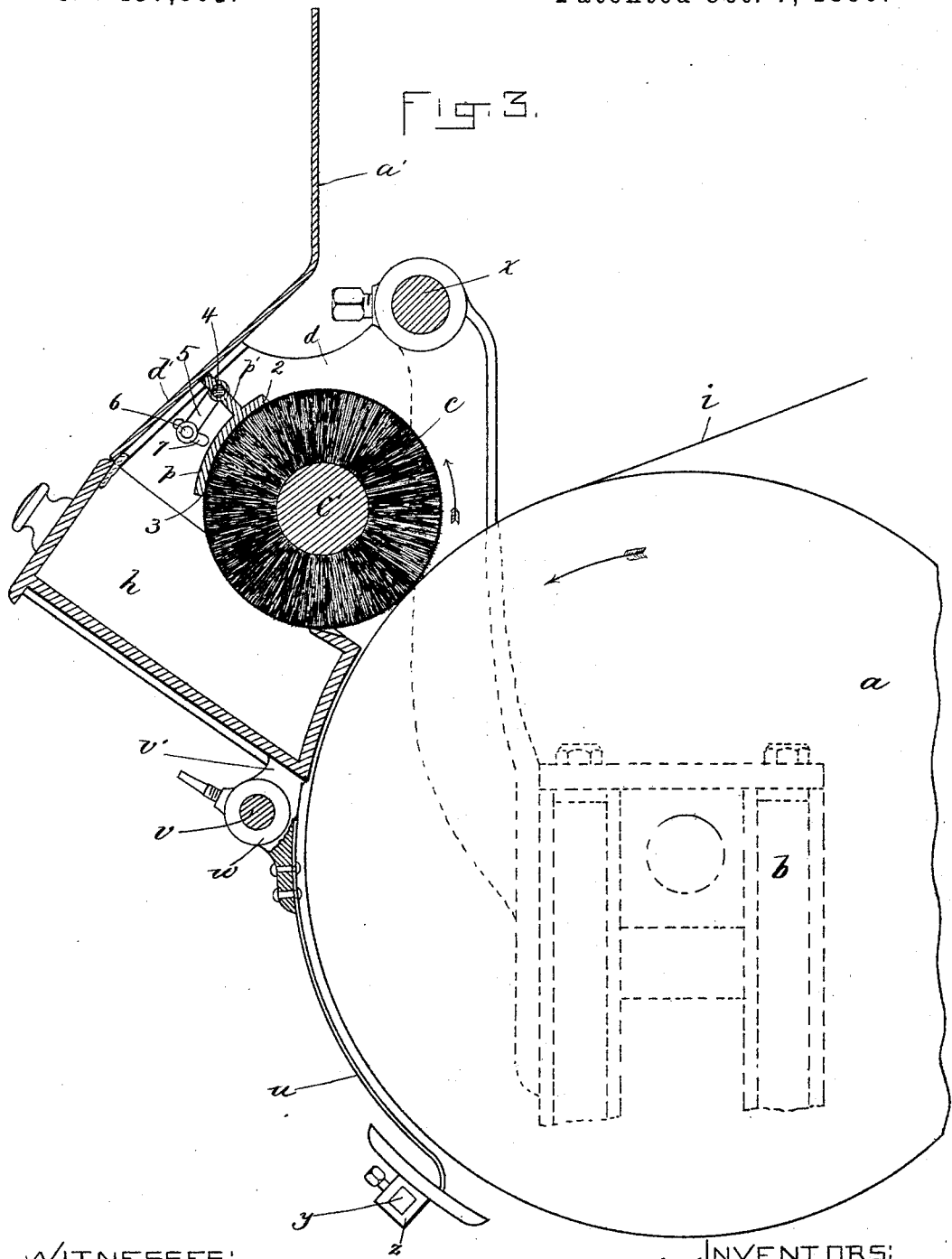

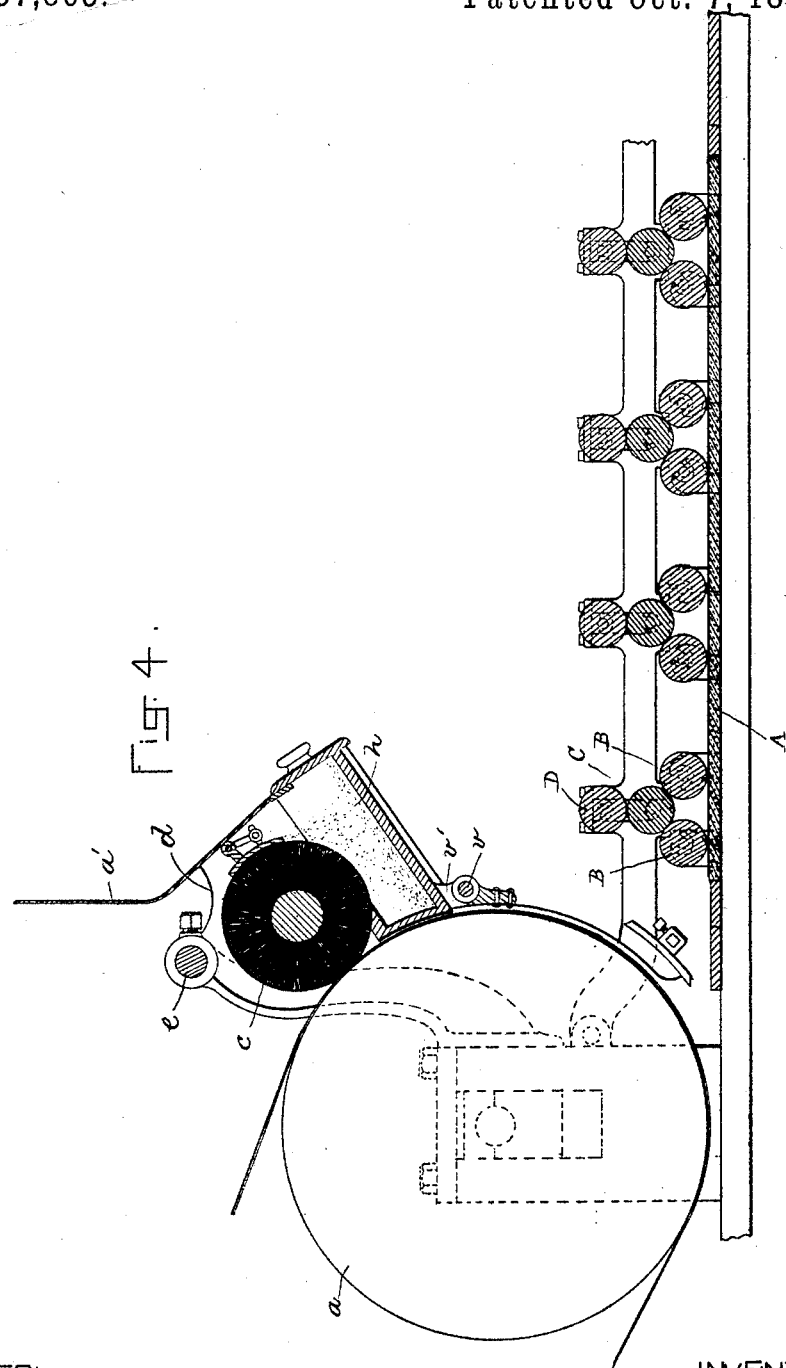

UNITED STATES PATENT OFFICE.

SAMUEL W. MARVIN, WESLEY BURNETT, AND CHARLES S. MARVIN, OF CAMBRIDGE, MASSACHUSETTS.

PAPER-DUST COLLECTOR FOR PRINTING-PRESSES.

SPECIFICATION forming part of Letters Patent No. 437,863, dated October 7, 1890.

Application filed April 19, 1890. Serial No. 348,624. (No model.)

*To all whom it may concern:*

Be it known that we, SAMUEL W. MARVIN, WESLEY BURNETT, and CHARLES S. MARVIN, all of Cambridge, in the county of Middlesex and State of Massachusetts, have invented certain new and useful Improvements in Paper-Dust Collectors for Printing-Presses, of which the following is a specification.

This invention relates to cylinder printing-presses, and has for its object to provide means for removing the lint and particles of dried pulp from the surface of the paper that is supplied to the machine, and to accumulate such matter in a closed receptacle, so that it cannot be scattered through the machine. In all printing establishments employing cylinder-presses much labor is caused by the accumulations of lint and dried pulp falling from the paper, such accumulations covering the exposed surfaces of the machine adhering to such surfaces as are oiled and inked, so that much difficulty is experienced in keeping the press properly cleaned and in keeping the inked parts in condition to do good work.

Our invention consists, first, in the combination, with the paper-supporting cylinder, type-form, and inking apparatus of a printing-press, of a rotary brush arranged to remove from the paper as it passes over the cylinder all loose particles of lint, dried pulp, &c., that may be present thereon, and a receptacle arranged to receive from the brush the particles removed thereby from the paper, thereby preventing the access of said particles to the form and inking devices and their adhesion thereto.

The invention also consists in certain details and combinations of parts, all of which we will now proceed to describe and claim.

In the accompanying drawings, forming a part of this specification, Figure 1 represents a side view of the cylinder of a cylinder printing-press, showing our improvements in the relation they occupy to the cylinder. Fig. 2 represents an end view of the same. Fig. 3 represents a section on line 3 3 of Fig. 1. Fig. 4 represents a longitudinal section through the bed of the press, showing the form and the inking-rolls in their relation to the cylinder and to the paper-cleaning device.

The same letters and numerals of reference indicate the same parts in all of the figures.

In the drawings, $a$ represents the cylinder of a cylinder printing-press, and $b\ b$ represent the supports in which the same is journaled. The cylinder and the other parts of the press may be of the usual or any suitable construction, the press having suitable means for holding and moving the type or printing-surface and means for inking the same.

We have shown in Fig. 4 a reciprocating type-bed having the form A and inking-rolls B B C D arranged to ink the printing-surfaces or characters of the form.

$c$ represents a rotary brush composed of radiating bristles or brush material attached to a shaft $c'$, which is mounted to rotate in bearings formed in plates or side pieces $d\ d$. Said plates or side pieces are supported by a horizontal rod $e$, which in turn is supported by standards $f\ f$, attached to the supports $b\ b$ of the cylinder. The side pieces $d\ d$ are formed to constitute the ends of a casing which is provided with a front piece $d'$, extending from one side piece $d$ to the other and attached to the side pieces in any suitable way—as, for example, by screws $g\ g$—as shown in Fig. 2.

$h$ represents a drawer or box which is fitted to slide in guides on the inner sides of the end pieces $d\ d$. When said drawer is closed, its front or outer end forms a continuation of the front piece $d'$, as shown in Fig. 3.

The brush $c$ is located above the drawer $h$ and in the space between the front piece $d'$ and the cylinder $a$, the end pieces $d\ d$ being at the ends of the brush. The periphery of the brush bears against the sheet $i$ of paper at a point where the said sheet is supported by the periphery of the cylinder $a$ and above the point where the paper is presented by the cylinder to the type-form A, which is supported and reciprocated upon the bed of the press under the cylinder in the usual manner.

The cylinder is rotated in the direction indicated by the arrow in Fig. 2 and the brush is rotated in the opposite direction by a suitable gearing connecting it with the cylinder.

We have here shown as the brush-rotating gearing a gear-wheel $j$, affixed to one end of the cylinder, a pinion $k$, mounted to rotate upon a fixed stud $m$, supported by an arm or bracket $n$, and a pinion $o$, affixed to the brush-shaft $c'$ and meshing with the pinion $k$. The arm or bracket $n$ is rendered adjustable by means of a stud $r$, affixed to one of the side pieces $d$ and projecting outwardly therefrom through a slot $n'$ in the said arm or bracket $n$, and a washer $s$, which is pressed against the arm or bracket $n$ by a nut $t$, engaged with the threaded portion of the stud $r$. When it is desired to throw the pinion $k$ out of gear, the nut $t$ is loosened and the arm $n$ swung on the stud $r$ as far as may be desired.

The described rotation of the brush causes the tips of its bristles to take up from the surface of the paper any dust, lint, &c., that may be easily detachable therefrom and to carry such particles into the space, at the bottom of which is the drawer $h$. A plate or bar $p$ is fixed to the side pieces $d\ d$ and extends lengthwise of the brush in contact therewith at a point opposite the line of contact of the brush with the paper. Said bar is preferably of the concave form shown in Fig. 3, and is preferably arranged to project inwardly toward the center of the brush farther at its rear edge 3 than at its forward edge 2, said rear edge being arranged to press or bend inwardly the brush-bristles, so that as they pass from under the bar $p$ they will spring back to their normal positions with sufficient force to throw off the particles of dust, lint, &c., that may adhere to them into the drawer $h$. The matter removed from the paper is therefore deposited in the drawer by the brush and is prevented from being scattered upon the inking-rolls, form, and other parts of the press. Much labor is saved by this contrivance, and the press is kept in a much neater condition than heretofore, and is adapted to do better typographical work, because the ink on the type is not clogged by lint, &c., from the paper.

The bar $p$ may be adjustable to vary its pressure upon the brush, and to this end we prefer to provide it with a shank $p'$, which is hung upon a rod 4, affixed to the side pieces $d$. Said shank has an arm 5, having a stud 6 at its outer end passing through a segmental slot 7 in one of the end pieces $d$. Said stud may have a thumb-screw at its outer end by which it may be clamped or released. By swinging the bar $p$ upon the rod 4 the edge 3 may be caused to press on the bristles with more or less force. The bristles are therefore bent backwardly in moving from the edge 2 to the edge 3, and spring out after leaving the edge 3, so that they throw any particles of dust, &c., collected by them into the drawer, as above stated.

The sheet-metal bands $u$, which extend over a portion of the periphery of the cylinder $a$ to prevent the paper dropping from the cylinder and striking the ink-rolls which ink the type, are attached to a rod $v$, which is affixed to ears $v'$, formed on or attached to the end pieces $d\ d$, said rod extending lengthwise of the cylinder and passing through the rollers $w$, which are attached to the upper ends of the bands $u$. Heretofore the bands $u$ have been attached at their upper ends to the rod $e$, affixed to the standards $f\ f$; but to obtain space for the brush we have shortened said bands and attached them to the lower portion of the casing in which the brush is located, as shown. The lower ends of the bands are supported by a bar $y$, affixed to the bed of the press in the usual manner and extending across the same, the lower ends of the bands having sockets $z$, through which the fixed bar $y$ passes.

We prefer to attach an upwardly-projecting plate $a'$ to the front piece $d'$ of the brush-casing, said flange or plate being arranged to arrest any particles of lint, &c., that may be thrown forward from the paper and cause said particles to drop onto the brush, which is located below said flange, as shown in Figs. 2 and 3.

The brush $c$ is preferably adjustable toward and from the cylinder, so that its pressure on the paper may be regulated and wear of its bristles compensated for.

We claim—

1. In a printing-press, the combination, with suitable printing mechanism, including a paper-supporting cylinder and inking mechanism co-operating with the printing mechanism, of a rotary brush arranged to sweep the outer surface of the paper at a point where the latter is supported by the cylinder, means for rotating said brush, and a receptacle arranged to receive from the brush the matter removed thereby from the paper, whereby the adhesion of such matter to the inked type and the inking devices is prevented, as set forth.

2. In a printing-press, the combination, with the cylinders, the rotary brush, bearings for the brush affixed to the frame of the machine, the fixed casing inclosing the brush and provided with the movable drawer located under the brush and adapted to be removed from the casing, and means for rotating said brush, as set forth.

3. In a printing-press, the combination, with the cylinder, the type-form or printing-surface, and suitable type-inking mechanism, of the gear $j$ on the cylinder, the rotary brush, the pinion $o$, affixed to the shaft of the brush, the pinion $k$, communicating motion from the gear $j$ to the pinion $o$, and the casing having bearings for the brush-shaft and for the pinion $k$, and the removable drawer $h$ in said casing, as set forth.

In testimony whereof we have signed our names to this specification, in the presence of two subscribing witnesses, this 17th day of April, A. D. 1890.

SAMUEL W. MARVIN.
WESLEY BURNETT.
CHARLES S. MARVIN.

Witnesses:
EWING W. HAMLEN,
ARTHUR W. CROSSLEY.